US006851656B2

United States Patent
Bauman et al.

(10) Patent No.: US 6,851,656 B2
(45) Date of Patent: Feb. 8, 2005

(54) LAPTOP COMPUTER PAPER SUPPORT DEVICE

(76) Inventors: Mark A. Bauman, 5545 Netherland Ave., Apartment 3C, Bronx, NY (US) 10471; Maxwell N. Bauman, 5545 Netherland Ave., Apartment 3C, Bronx, NY (US) 10471

( * ) Notice: Subject to any disclaimer, the term of this patent is extended or adjusted under 35 U.S.C. 154(b) by 8 days.

(21) Appl. No.: 10/613,614

(22) Filed: Jul. 3, 2003

(65) Prior Publication Data

US 2005/0001135 A1 Jan. 6, 2005

(51) Int. Cl.[7] ................................................. B41J 11/02
(52) U.S. Cl. ..................... 248/442.2; 248/453; 248/918
(58) Field of Search ............................. 248/442.2, 448, 248/449, 451, 453, 460, 918

(56) References Cited

U.S. PATENT DOCUMENTS

| | | | | |
|---|---|---|---|---|
| 3,433,443 | A | | 3/1969 | Mangan et al. ............. 248/214 |
| 4,569,498 | A | | 2/1986 | Ermanski ................. 248/441.1 |
| 4,902,078 | A | * | 2/1990 | Judd .......................... 312/7.2 |
| 5,122,941 | A | * | 6/1992 | Gross et al. ................. 362/276 |
| 5,370,241 | A | | 12/1994 | Silvers ......................... 211/13 |
| 5,505,421 | A | * | 4/1996 | Marthaler ................. 248/442.2 |
| 5,533,702 | A | | 7/1996 | Koch ....................... 248/442.2 |
| 5,549,268 | A | | 8/1996 | Hopwood ................ 248/442.2 |
| 5,601,270 | A | * | 2/1997 | Chen ........................ 248/454 |
| 5,725,191 | A | | 3/1998 | Nemeth ................... 248/442.2 |
| 5,769,374 | A | | 6/1998 | Martin et al. ........... 248/221.11 |
| 5,823,500 | A | * | 10/1998 | La Coste ..................... 248/444 |
| 5,826,840 | A | * | 10/1998 | Yun ............................ 248/118 |
| 6,244,555 | B1 | | 6/2001 | Benja-Athon ............ 248/441.1 |

* cited by examiner

Primary Examiner—Ramon O Ramirez
(74) Attorney, Agent, or Firm—Barnes & Thornburg LLP

(57) ABSTRACT

A laptop computer paper support device for removably setting on the top of a laptop computer case and for holding at least one document above a screen on a laptop computer. The laptop computer paper support device comprises a support member and shelf member. The support member includes a front surface, a top edge, a bottom edge, a left edge, a right edge and a connection axis passing through the left edge and the right edge. The connection axis is substantially perpendicular to the left edge. The shelf member is pivotally attached at the connection axis to the front surface of the support member. The shelf member includes a top surface and a bottom surface. The shelf member also includes a shelf ledge adapted for maintaining a document upon the top surface of the shelf member. The shelf ledge is attached to the top surface and extends upwardly from the top surface at a non-zero angle. The shelf member further includes a shelf flange adapted for setting on the top of a laptop computer case. The shelf flange is attached to the bottom surface and extends downwardly from the bottom surface at a non-zero angle. The shelf member is moveable between an open position where the shelf is substantially perpendicular to the support member and a closed position where the shelf member is substantially parallel to the support member.

28 Claims, 10 Drawing Sheets

LAPTOP COMPUTER PAPER SUPPORT DEVICE

BACKGROUND OF THE INVENTION

This invention relates generally to a laptop computer paper support device and, more particularly, this invention relates to a laptop computer support device that sets on the top of a laptop computer case for holding at least one document above a laptop computer screen.

Since the advent of the personal computer, manufacturers and industrial users have continually developed faster, smaller and more versatile machines, including laptop computers that may be dedicated to performing a specific function such as word processing, or may be all-purpose computing machines capable of executing a variety of types of software programs. These laptop computers may interact with a variety of portable and stationary input/output devices such as a printer, a light pen, and a mouse. In addition, laptop computers are frequently connected to a network such as the Internet or an intranet. Moreover, these computers usually provide an electric cord for receiving power from a standard electrical outlet, as well as a battery pack for powering the unit when an electrical outlet is unavailable or is inconvenient. The portability and versatility of laptop computers, in combination with the ever-decreasing size and weight of these machines, has attracted a significant number of users, with the number of users expected to continue to dramatically increase in the near term.

One benefit of laptop computers that has attracted a significant number of users is that they may be used in any manufacturing, professional or personal setting where little, if any, desk space is available, or where the computer must be supported on the use's legs, for example in an automobile or airplane. Thus, the laptop computer permits the user to be productive during previously unproductive travel time.

However, one problem associated with laptop computers, and the environment in which they are generally operated, is the inability to support documents adjacent to the computer screen, either for informational reference while working on the computer, for example reference materials required when developing spreadsheets; or simply for viewing while the document is keyed into the computer. This problem is especially pronounced when the portable computer is used on an airplane or in an automobile where there are no flat surfaces available, and where space is extremely limited.

BRIEF SUMMARY OF THE INVENTION

One aspect of the invention is a laptop computer paper support device for removably setting on the top of a laptop computer case for holding at least one document above a screen on a laptop computer. The laptop computer paper support device comprises a support member and shelf member. The support member includes a front surface, a top edge, a bottom edge, a left edge, a right edge and a connection axis passing through the left edge and the right edge. The connection axis is substantially perpendicular to the left edge. The shelf member is pivotally attached at the connection axis to the front surface of the support member. The shelf member includes a top surface and a bottom surface. The shelf member also includes a shelf ledge adapted for maintaining a document upon the top surface of the shelf member. The shelf ledge is attached to the top surface and extends upwardly from the top surface at a non-zero angle. The shelf member further includes a shelf flange adapted for setting on the top of a laptop computer case. The shelf flange is attached to the bottom surface and extends downwardly from the bottom surface at a non-zero angle. The shelf member is moveable between an open position where the shelf is substantially perpendicular to the support member and a closed position where the shelf member is substantially parallel to the support member.

Another aspect of the invention is the combination of a laptop computer and a laptop computer paper support device. The laptop computer comprises a laptop computer case including a top of the laptop computer case. The laptop computer paper support device comprises a support member and shelf member. The support member includes a front surface, a top edge, a bottom edge, a left edge, a right edge and a connection axis passing through the left edge and the right edge. The connection axis is substantially perpendicular to the left edge. The shelf member is pivotally attached at the connection axis to the front surface of the support member. The shelf member includes a top surface and a bottom surface. The shelf member also includes a shelf ledge adapted for maintaining a document upon the top surface of the shelf member. The shelf ledge is attached to the top surface and extends upwardly from the top surface at a non-zero angle. The shelf member further includes a shelf flange adapted for setting on the top of a laptop computer case. The shelf flange is attached to the bottom surface and extends downwardly from the bottom surface at a non-zero angle. The shelf member is moveable between an open position where the shelf is substantially perpendicular to the support member and a closed position where the shelf member is substantially parallel to the support member.

A further aspect of the invention is a method of utilizing a laptop computer paper support device for removably setting on the top of a laptop computer case and for holding at least one document above a screen on the laptop computer. The method comprises receiving the laptop computer paper support device in a closed position. The device comprises a support member and shelf member. The support member includes a front surface, a top edge, a bottom edge, a left edge, a right edge and a connection axis passing through the left edge and the right edge. The connection axis is substantially perpendicular to the left edge. The shelf member is pivotally attached at the connection axis to the front surface of the support member. The shelf member includes a top surface and a bottom surface. The shelf member also includes a shelf ledge adapted for maintaining a document upon the top surface of the shelf member. The shelf ledge is attached to the top surface and extends upwardly from the top surface at a non-zero angle. The shelf member further includes a shelf flange adapted for setting on the top of a laptop computer case. The shelf flange is attached to the bottom surface and extends downwardly from the bottom surface at a non-zero angle. The shelf member is moveable between an open position where the shelf is substantially perpendicular to the support member and a closed position where the shelf member is substantially parallel to the support member. The method further comprises moving said device into said open position and setting the device on top of the laptop computer case.

DETAILED DESCRIPTION OF THE INVENTION

An exemplary embodiment of the present invention is a laptop computer paper support device for removably setting on the top of a laptop computer case. The device holds at least one document above the laptop computer screen for viewing by the user of the laptop computer. In an exemplary embodiment of the present invention, the device comprises a support member and a shelf member. The shelf member is pivotally attached about a connection axis to the support member. The device may be locked into an open position, with the shelf substantially perpendicular to the support member, or it may be locked into a closed position, with the shelf substantially parallel to the support member. A flange on the bottom of the shelf along with the portion of the support member below the connection axis form a lower pocket for receiving the open top of a laptop computer case. A shelf ledge on the top of the shelf along with the portion of the support member above the connection axis form an upper pocket to hold documents.

An exemplary embodiment of the present invention includes a support member 100 and a shelf member 200. The support member 100 is described in reference to FIGS. 1 and 2, and the shelf member 200 is described in reference to FIGS. 3 and 4. The combination of the support member 100 and the shelf member 200 is described in reference to FIGS. 5 and 6.

Figure 1:
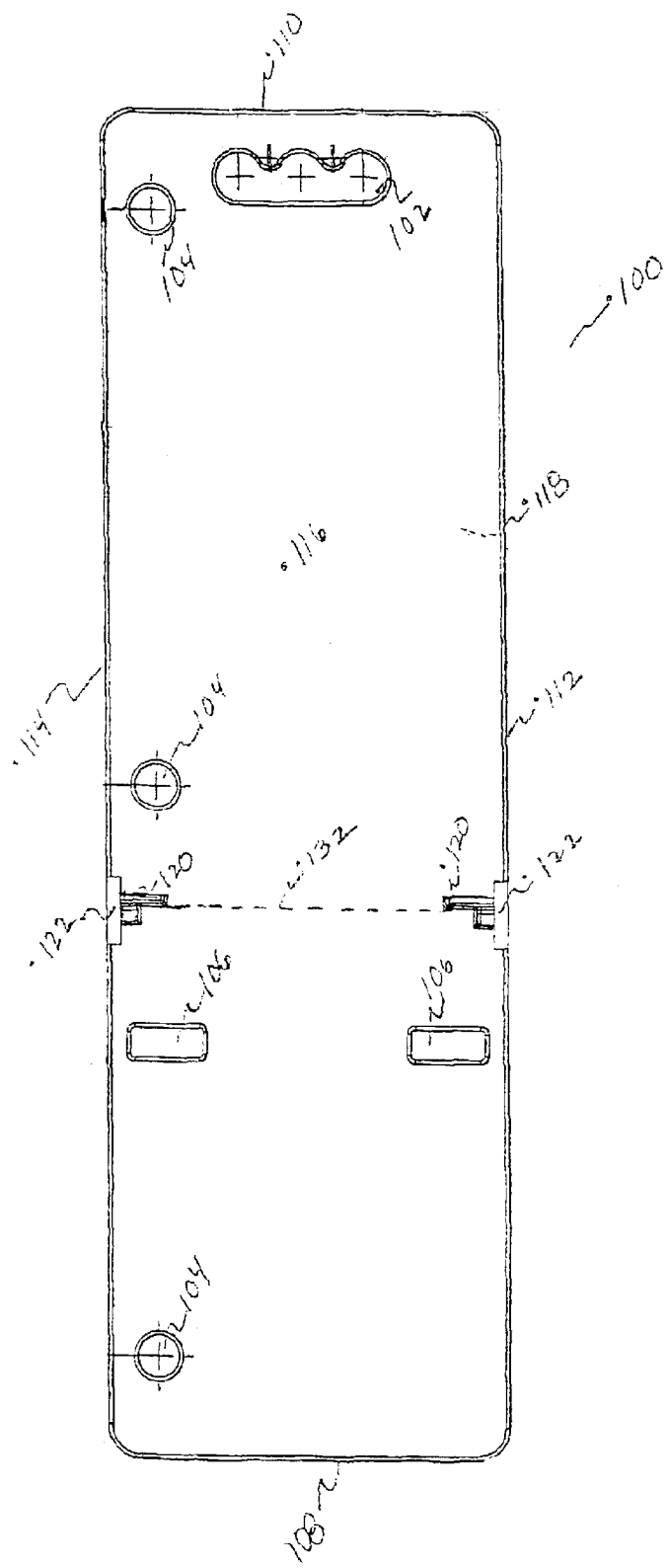
FIG. 1 is a front plan view of a support member utilized in an exemplary embodiment of the present invention.

FIG. 1 is a front plan view of a support member 100 utilized in an exemplary embodiment of the present invention. The support member 100 includes a left edge 114 and a right edge 112 that are parallel to each other and spaced apart from each other. In addition, the support member 100 includes a top edge 110 and a bottom edge 108 that are parallel to each other and spaced apart from each other. The top edge 110 and the bottom edge 108 are substantially perpendicular to the left edge 114 and the right edge 112. In the exemplary embodiment depicted in FIG. 1, the support member 100 is rectangular in shape with rounded edges for easy storage in a notebook, but other shapes are possible. For example the support member 100 may be trapezoidal or triangular or freeform in shape and the opposite edges are not required to be parallel to each other. The support member 100 also includes a front surface 116 and a back surface 118. The front surface 116 faces the laptop computer user and the back surface 118 faces the rear side of the laptop computer. The support member 100 also includes a connection axis 132 that defines the pivot point for a shelf member 200 that attaches to the support member 100.

FIG. 1 also depicts two shelf support members 120 that may be utilized to keep the device in an open position when it is being utilized to hold a document above the computer screen. The top surface of the shelf member 200 may press against the bottom of the shelf support members 120 when the device is in an open position. In the exemplary embodiment depicted in FIG. 1, the two shelf support members 120 prevent the shelf member 200 from being at substantially less than a ninety-degree angle from the front surface 116 of the support member 100 above the connection axis 132 when the device is in an open position. Other positions of the shelf member 200 with respect to the support member 100 are possible and may be varied based on the placement of the shelf support members 120. In addition, it is possible to utilize just one shelf support member 120 and provide the same functionality described above. The exemplary support member 100 depicted in FIG. 1 also includes two pivot arches 122. The pivot arches 122 are located on the left and right edge of the support member 100 and extend towards the back surface of the support member 100 around the connection axis 132. The pivot arches 122 allow the shelf member 200 to move between the open and closed positions. The pivot arches 122 depicted in FIG. 1 are semi-circles, but any circular shape allowing the shelf member 200 to pivot may be utilized to allow movement between the open and closed positions.

FIG. 1 also includes a hanging aperture 102 that may be utilized to hang the device from a store display or from any type of holder or fastener that may be inserted into the hanging aperture 102. The hanging aperture 102 may be any size or shape and may be placed in any location on the device. In an exemplary embodiment of the present invention, the hanging aperture 102 is located adjacent the top edge 110 of the support member 100 and allows the device to be hung from a store display or from a marketing booth display. The device also includes several ring apertures 104. They may be utilized to store the device in a notebook when it is not in use. Generally, the device would be stored in the closed position and would lay flat for storage in a notebook. The number and arrangement of ring apertures may vary based on the type of notebook. In the exemplary embodiment depicted in FIG. 1, there are three ring apertures 104. In an alternate exemplary embodiment there may be seven ring apertures 104 to accommodate a seven-ring notebook. Any arrangement and/or combination of ring apertures 104 are possible and the layout depends on customer requirements. Alternatively, the device may be stored in a pocket of a laptop computer case and not attached to a display device or a notebook. The device may be stored in the closed position in order to take a minimal amount of space.

Figure 2:
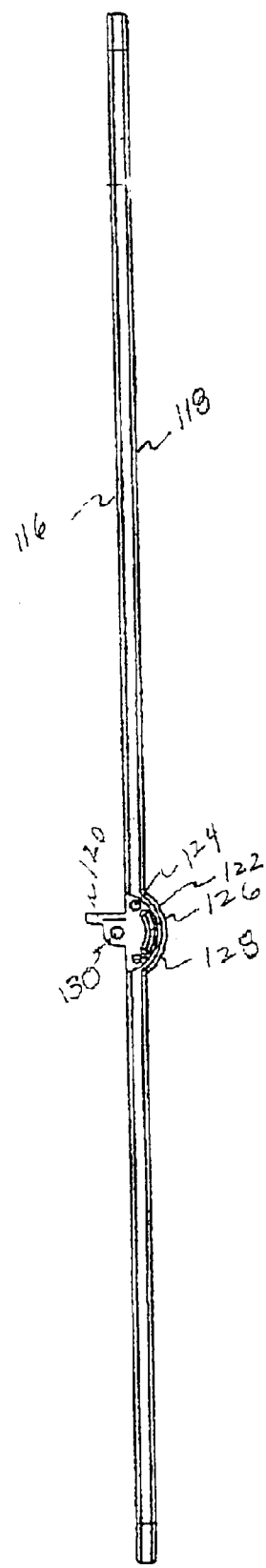
FIG. 2 is a side plan view of the support member in FIG. 1.

FIG. 2 is a side plan view of the support member 100 in FIG. 1. FIG. 2 depicts the front surface 116 and the back surface 108. The front surface 116 includes a shelf support member 120 as discussed previously, as well as a pivot aperture 130 for connecting the shelf member 206 to the support member 100. The pivot aperture 130 is located on the connection axis 132 of the support member 200 and is adapted to receive a pivot pin from the shelf member 200 to attach the shelf member 200 to the support member 100. Also depicted in FIG. 2, is a pivot arch 122 along with the closed position aperture 124, the open position aperture 128 and the pivot groove 126. The closed position aperture 124 is adapted to contain a locking pin on the shelf member 200 when the device is in a closed position. This is an optional aperture and aids in keeping the device in a closed position for storage. In addition, the open position aperture 124 is adapted to contain the locking pin on the shelf member 200 when the device is in an open position. The open position aperture 124 along with the locking pin and the shelf support member 120 keep the device in an open position while it is setting on the top of a laptop computer case. In an alternate exemplary embodiment of the present invention, one or both of the locking pin and the shelf support member 120 may be utilized to keep the device in an open position. The pivot groove 126 receives the locking pin when the device is being changed from the open position to the closed position and when the device is being changed from the closed position to the open position.

The support member 100 may vary in size and dimension. In an exemplary embodiment of the present invention, such as the one depicted in FIG. 1, the support member 100 is substantially planar and rectangular in shape with dimensions of approximately ten inches by about three inches. The size of the support member 100 may vary based on the dimensions of a notebook that the device is targeted to be stored in or on the dimensions of a pocket in a target laptop computer case. In addition, the placement of the connection axis 132 may vary as long as the device still provides room to support and hold documents above the connection axis 132 and the support member 100 still provides leverage against the back of the laptop computer case for holding the device in place when in the open position. In the exemplary embodiment of the present invention depicted in FIG. 1, the connection axis 132 is about four inches from the bottom edge 108 and approximately six inches from the top edge 110 of the support member 100. The support member 100 may be any shape that allow for a document resting place and a pocket for setting on the top of a laptop computer case 236 (e.g., kidney shaped, heart shaped, free-form shaped).

Figure 3:
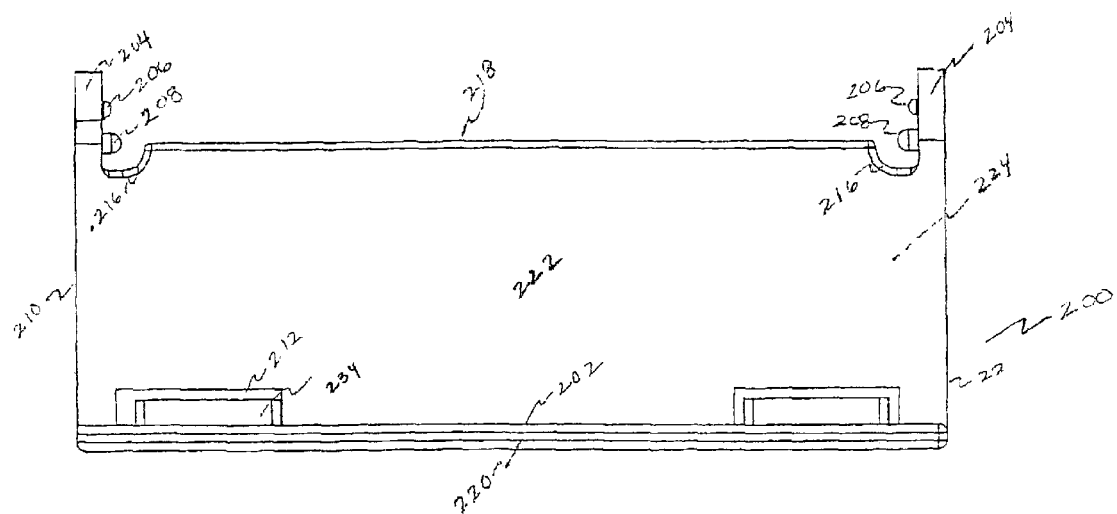
FIG. 3 is a top plan view of a shelf member utilized in an exemplary embodiment of the present invention.

FIG. 3 is a top plan view of an exemplary embodiment of a shelf member 200. The shelf member 200 includes a top side 208, a bottom side 202, a left side 210 and a right side 226. In addition, the shelf member 200 includes a top surface 222 and a bottom surface 224. The shelf member depicted in FIG. 3 includes two shelf legs 204. Each shelf leg 204 defines a shelf inlet 216 and contains a locking pin 206 and a pivot pin 208. The pivot pin 208 is the connection point of the shelf member 200 to the support member 100. The locking pin 206 aids in keeping the shelf member 200 in an open position by snapping into the open position aperture 128 on the support member 100, or in a locked position by snapping into the closed position aperture 124 on the support member 100. When moving between the closed position and the open position, the locking pin 206 moves through the pivot groove 126 on the support member 100. Also shown in the top plan view of FIG. 3 is a shelf ledge 220, a shelf aperture 212 and flange hooks 234. The shelf aperture 212 is optional and may be included to accommodate plastic mold requirements if the device is molded from plastic or to make the device more compact when being stored in a closed position.

Figure 4:
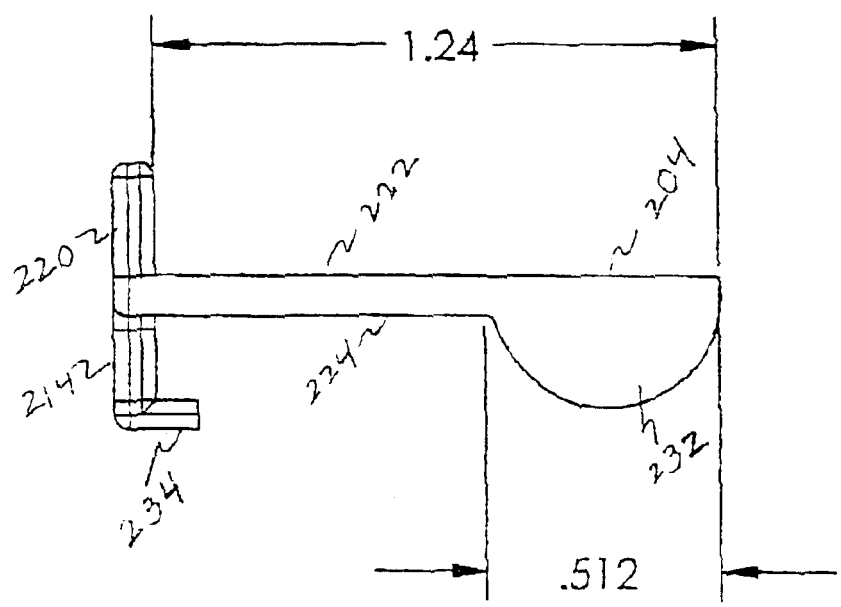
FIG. 4 is a side plan view of the shelf member in FIG. 3.

FIG. 4 is a side plan view of the exemplary shelf member in FIG. 3. The pivot surface 232 may be a semi-circle shaped extrusion that is molded to fit the pivot arch 122 on the support member 100. The pivot surface 232 extends from the lower edge of the shelf leg 204 and includes both the pivot pin 208 and the locking pin 206 located on the inside edge of the shelf leg 204. The top surface 222 of the shelf member 200 includes a shelf ledge 220 for maintaining a document on the top surface of the shelf member 200. The shelf ledge 220 may hold a single sheet of paper, or it may hold a book or magazine. The size of the shelf ledge 220 and the dimensions of the device may be adapted based on the expected type of document or documents to be held in place by the shelf ledge 220. The shelf ledge 220 is attached to the top surface 222 of the shelf member 200 and it extends upwardly from the top surface 222 at a non-zero angle. In the exemplary embodiment depicted in FIG. 4, the shelf ledge 220 extends upwardly from the top surface 222 at about ninety degrees. The bottom surface 224 of the shelf member 200 includes a shelf flange 214 that is adapted for removably retaining the paper support device on the top of a laptop computer case such that the shelf flange 214 is in front of the case while the bottom surface 224 sits atop the case. The shelf flange 214 is attached to the bottom surface 224 of the shelf member 200 and it extends downwardly from the bottom surface 224 at a non-zero angle. In embodiment depicted in FIG. 4, the shelf flange 214 is attached to the shelf member 200 at an angle of about ninety degrees. The shelf flange 214 depicted in FIG. 4 also includes flange hooks 234. The flange hooks 234 are optional and may be utilized to provide a more secure fit for the device on to the top of some types of laptop computers.

The shelf member 200 depicted in FIGS. 3 and 4 has a substantially planar top surface 222 and a substantially planar bottom surface 224 that contains two shelf legs 204 extending from the top side 218 of the shelf member 200. The pivot surface 232 of each shelf leg 204 is shaped as a semi-circle for moving through the pivot groove 126 in the support member 100. In an exemplary embodiment of the present invention, the shelf member 200 is about the same width as the support member (e.g., about three inches) and the diameter of the pivot surface 232 is about one-half of an inch. The height of the shelf member 200 depicted in FIGS. 3 and 4 is about one inch, the height of the shelf ledge 220 about one-quarter of an inch, and the height of the shelf flange 214 about one-quarter of an inch. These measurements may vary, but the height of the shelf flange 214 and the shelf ledge 220 will have an impact on the size of the device when it is in the closed position in the embodiment of the shelf member 200 depicted in FIGS. 3 and 4. Similar to the support member 100, the shape of the shelf member 200 may vary.

Figure 5:
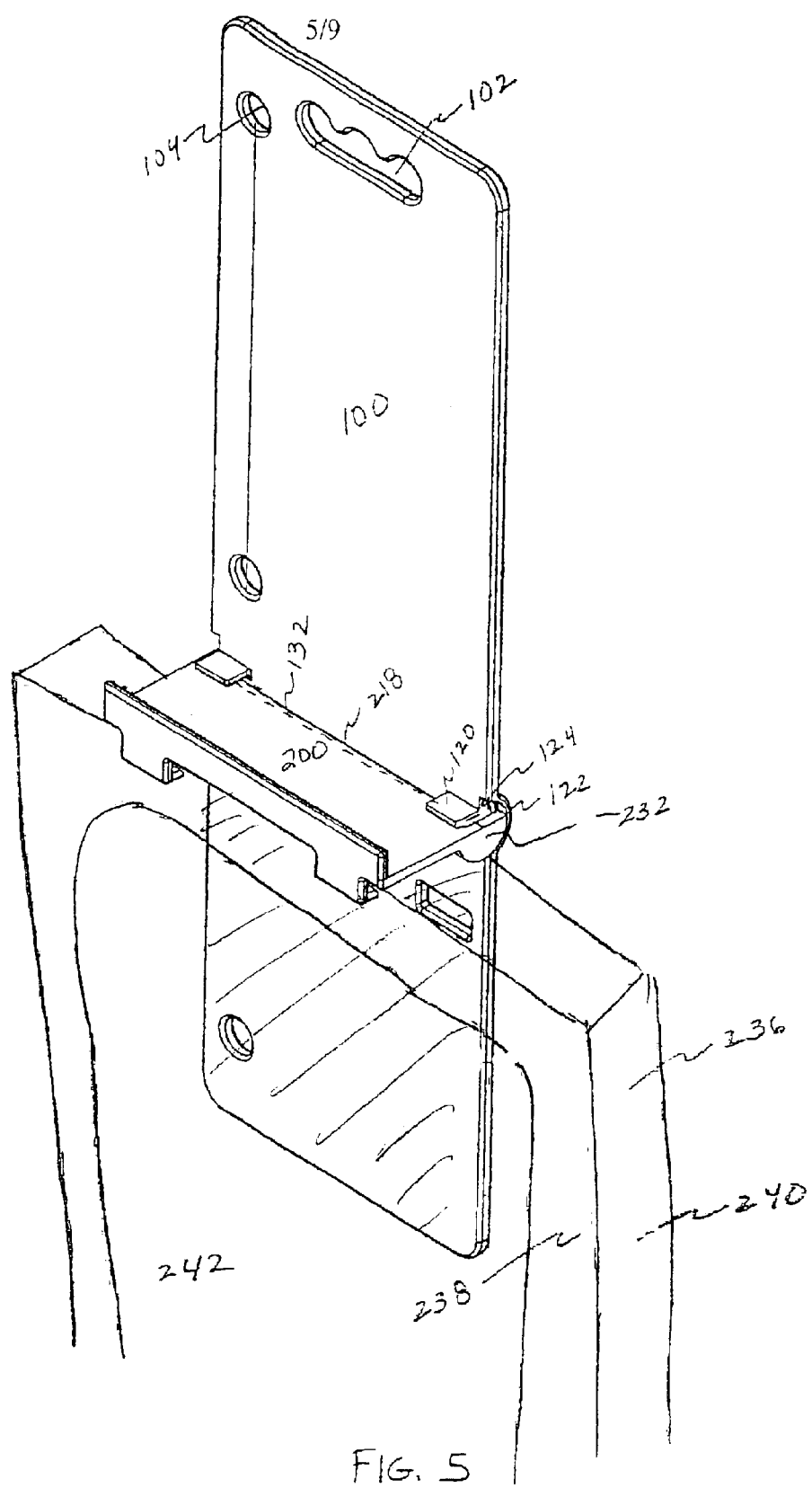
FIG. 5 is a perspective view of an exemplary embodiment of the present invention in an open position.

FIG. 5 is a perspective view of an exemplary embodiment of the present invention in an open position and setting on the top of a laptop computer case 236. The device shown in FIG. 5 includes the shelf member 200 being connected to the support member 100 about the connection axis 132 by inserting the pivot pins 208 on the shelf member 200 into the pivot apertures 130 on the support member 100. The device is held in an open position by having the locking pin 206 on the shelf member 200 being inserted into the open position aperture 128 on the support member 100. In addition, the shelf member 200 is pressing up against the shelf support member 120 to keep the shelf member 200 at about a ninety-degree angle from the portion of the front surface 116 of the support member 100 above the connection axis 132.

The device depicted in FIG. 5 is setting on the top of a laptop computer case 236. The laptop computer includes a computer screen 242 on the front of the laptop computer case 238. The pocket formed by the shelf flange 214, the bottom surface 224 of the shelf member 200 and the portion of the support member 100 below the connection axis 132 hold the device on the top of the laptop computer case 236. The portion of the support member 100 below the connection axis 132 rests up against and is substantially parallel with the back of the laptop computer case 240. The flange hooks 234 depicted in FIG. 5 may be utilized to assist in the holding and may be useful when the top of the laptop computer case 236 includes an indentation for accepting the flange hooks 234. With the device in the open position and setting on the top of the laptop computer case 236, the laptop computer use may put documents in the upper pocket defined by the shelf ledge 220, top surface 222 of the shelf member 200 and the front surface 116 of the support member 100 above the connection axis 132.

Figure 6:
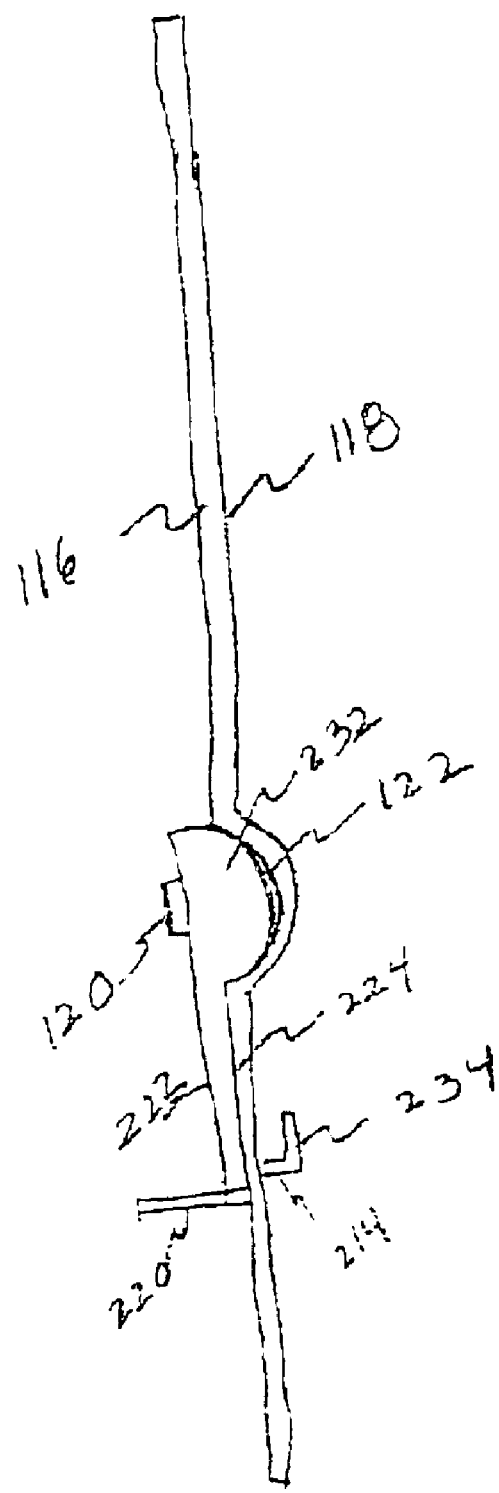
FIG. 6 is a side plan view of an exemplary embodiment of the present invention in a closed position.

FIG. 6 is a side plan view of an exemplary embodiment of the present invention in a closed position. As described previously, when the device is in a closed position, the locking pin 206 on the shelf member 200 is inserted into the closed position aperture 124 on the support member 100. In addition, a portion of the shelf flange 214 is fit into the shelf leg aperture 106 on the support member 100. In this manner, the storage of the device in the closed position may take up less space. Also shown in FIG. 6, is one of the flange hooks 234 on the portion of the shelf flange 214 that has been inserted through the shelf leg aperture 106 on the support member 100.

Figure 7:
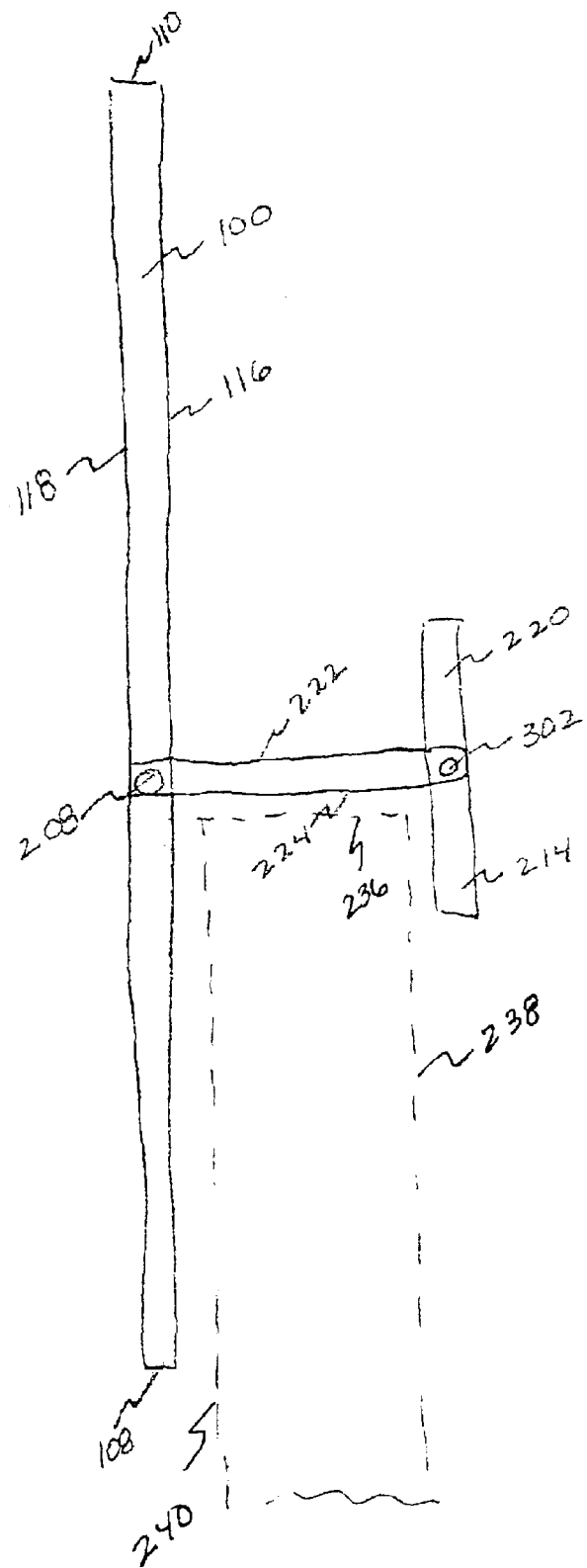
FIG. 7 is a side plan view of an alternate exemplary embodiment of the present invention in an open position.

FIG. 7 is a side plan view of an alternate exemplary embodiment of the present invention in an open position. The support member 100 is similar to the support member 100 described previously. The shelf member 200 also includes a top surface 222, a bottom surface 224, a shelf ledge 220 and a shelf flange 214. In addition, the shelf member 200 is pivotally attached to the support member 100 by a pivot pin 208. One difference between the two embodiments is that the shelf ledge 220 and the shelf flange 214 are pivotally connected, via a shelf pivot pin 302, to the shelf member 200. In the open position, this alternate embodiment provides the same pocket, formed by the shelf flange 214, the bottom surface 224 of the shelf member 200 and the portion of the support member 100 below the pivot point to hold the device on the top of the laptop computer case 236. Similarly, the pocket defined by the shelf ledge 220, the top surface 222 of the shelf member 200 and the front surface 116 of the support member 100 above the pivot point may be utilized to hold documents for use by the user of the laptop computer.

Figure 8:
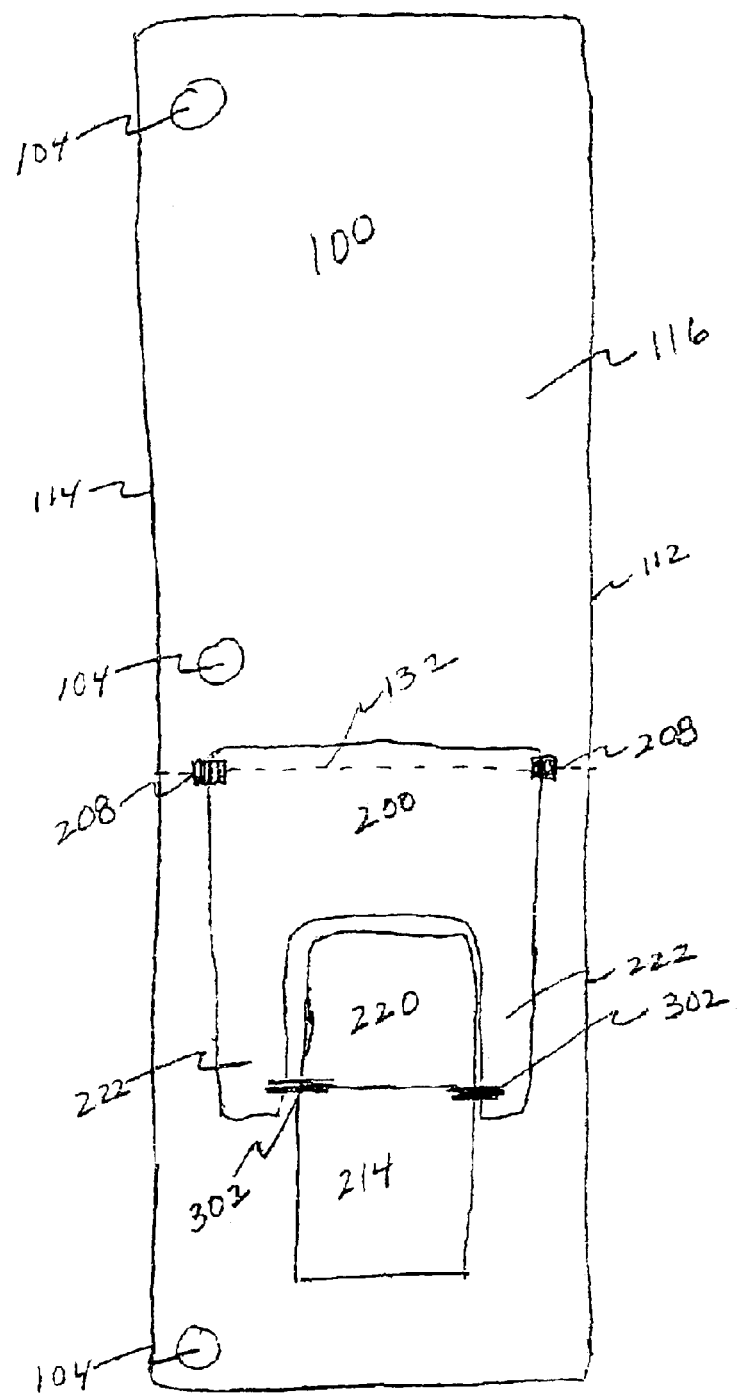
FIG. 8 is a front plan view of the alternate exemplary embodiment of FIG. 7 in a closed position.

FIG. 8 is a front plan view of the alternate exemplary embodiment of FIG. 7 in a closed position. This embodiment allows the device to lay almost completely flat when in the closed position. As depicted in FIG. 8, the shelf ledge 200 and the shelf flange 214 lie flat against the front surface 116 of the support member 100 or alternately, against the shelf member 200. The locking mechanisms discussed previously may be utilized to hold the device in either the open position or the closed position.

Figure 9:
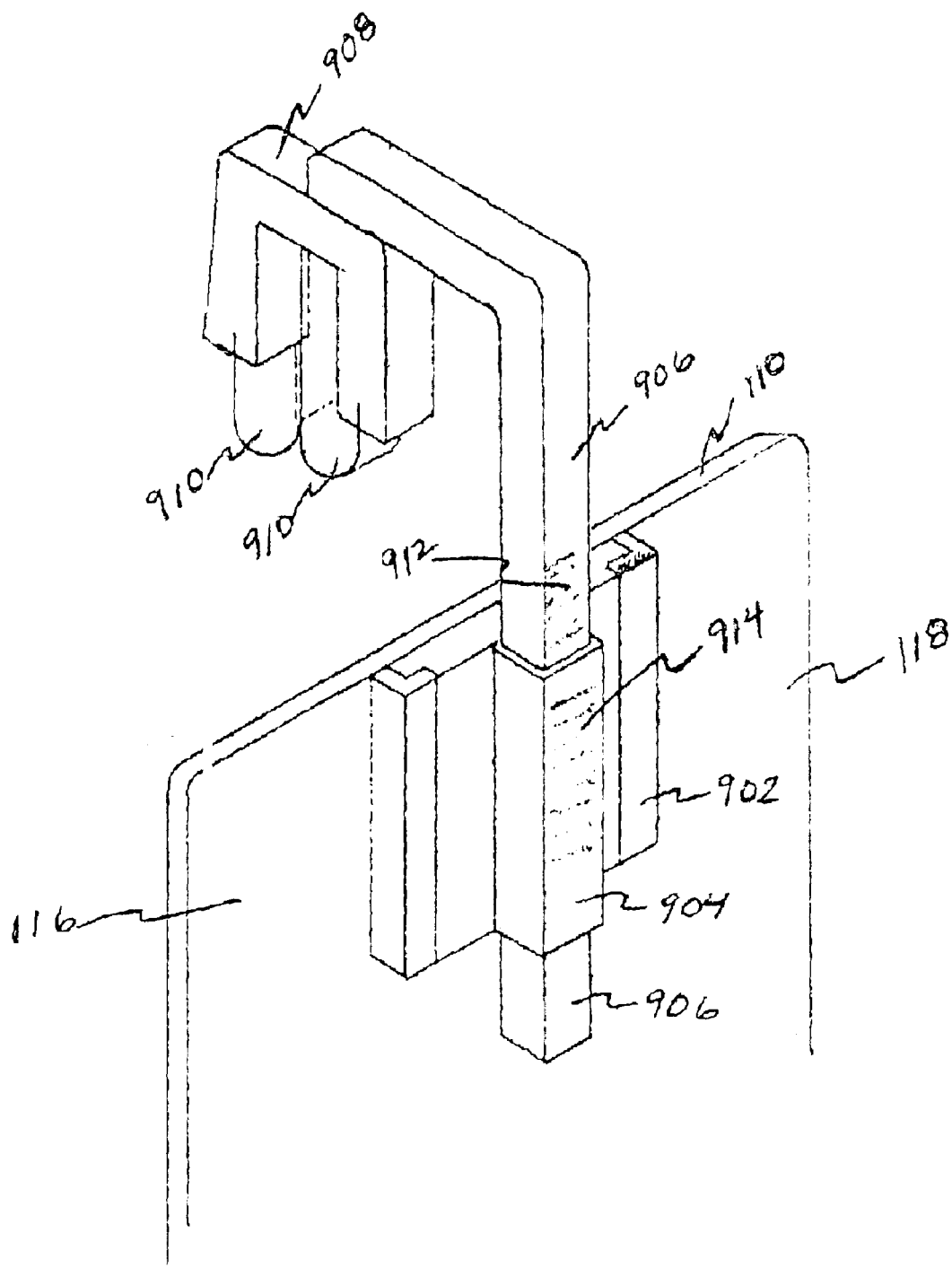
FIG. 9 is a perspective view of an alternate exemplary embodiment of the present invention including a document clip member.

FIG. 9 is a perspective view of an alternate exemplary embodiment of the present invention including a document clip member. As depicted in FIG. 9, an exemplary embodiment of the document clip member includes a hook attachment 902 connected to the back surface 118 of the support member 100. In an exemplary embodiment of the present invention, the hook attachment 902 is connected to the support member 100 via the hanging aperture 102 and the hook attachment 902 may be removable. The hook attachment 902 includes a hook channel 904. The interior of the hook channel 904 contains a plurality of indents 914 at various heights. The document clip member also includes a hook 906 that is sized to fit into the hook channel 904. The hook 906 also includes a plurality of nubs 912, at various heights, adapted to fit into the indents 914 in the hook channel 904. By moving the hook and connecting the nubs 912 to the indents 914, the hook 906 may be adjusted to fit a variety of document heights. As shown in FIG. 9, the hook 906 extends above the height of the support member 100 and out toward the front surface 116 of the support member 100. Attached to the end of the hook 906 is a hook extension 908 that includes two clips 910 for holding the document in place between the clips 910. In an alternate embodiment of the present invention, the hook extension 908 may be adjusted relative to the front surface 116 of the support member 100 to hold a document closer or further from the front surface 116 of the support member 100.

The document clip member depicted in FIG. 9 may be stored flush against the back surface 118 of the support member 100 by pulling the hook 906 out the of the hook channel 904 and inserting it back into the hook channel 904 in the opposite direction shown in FIG. 9. By inserting the hook 906 upside down and sideways into the hook channel 904, the laptop computer paper support device may be stored in more compact manner. In order to do insert the hook 906 into the hook channel 904 in this manner, the hook channel 904 and the hook 906 must be substantially square in shape. Other manners of implementing the document clip member are possible without departing from the spirit of the invention. For example, the hook attachment 902 may be connected to the support member 100 via one or more of the ring apertures and the hook 906 could extend out past the right edge 112 or left edge 114 of the support member 100 with the clips 910 holding the side edge of a document. Alternatively, the hook attachment 902 could be permanently attached to the support member 100 by using glue or molding it to the support member 100, or the document clip member could just be a standard clip attached to the right edge 112, left edge 114 or top edge 110 of the support member 100.

The laptop computer paper holder support member 100 may be made in a variety of colors as well as other shapes and configurations different from the substantially rectangular shape described in the previous embodiments. Plastic materials and molding techniques known in the art may be utilized to create the device. For example, plastics such as polycarbonate or acrylonitrile butadiene styrene (ABS) may be utilized. The device may be utilized as a marketing tool by adding a company logo to the device. Alternatively, a corporation may add frequently called phone numbers or web sites addresses to the device. For example, a computer company may include the device with laptop computers and imprint customer assistance numbers and web sites on the device.

Figure 10:
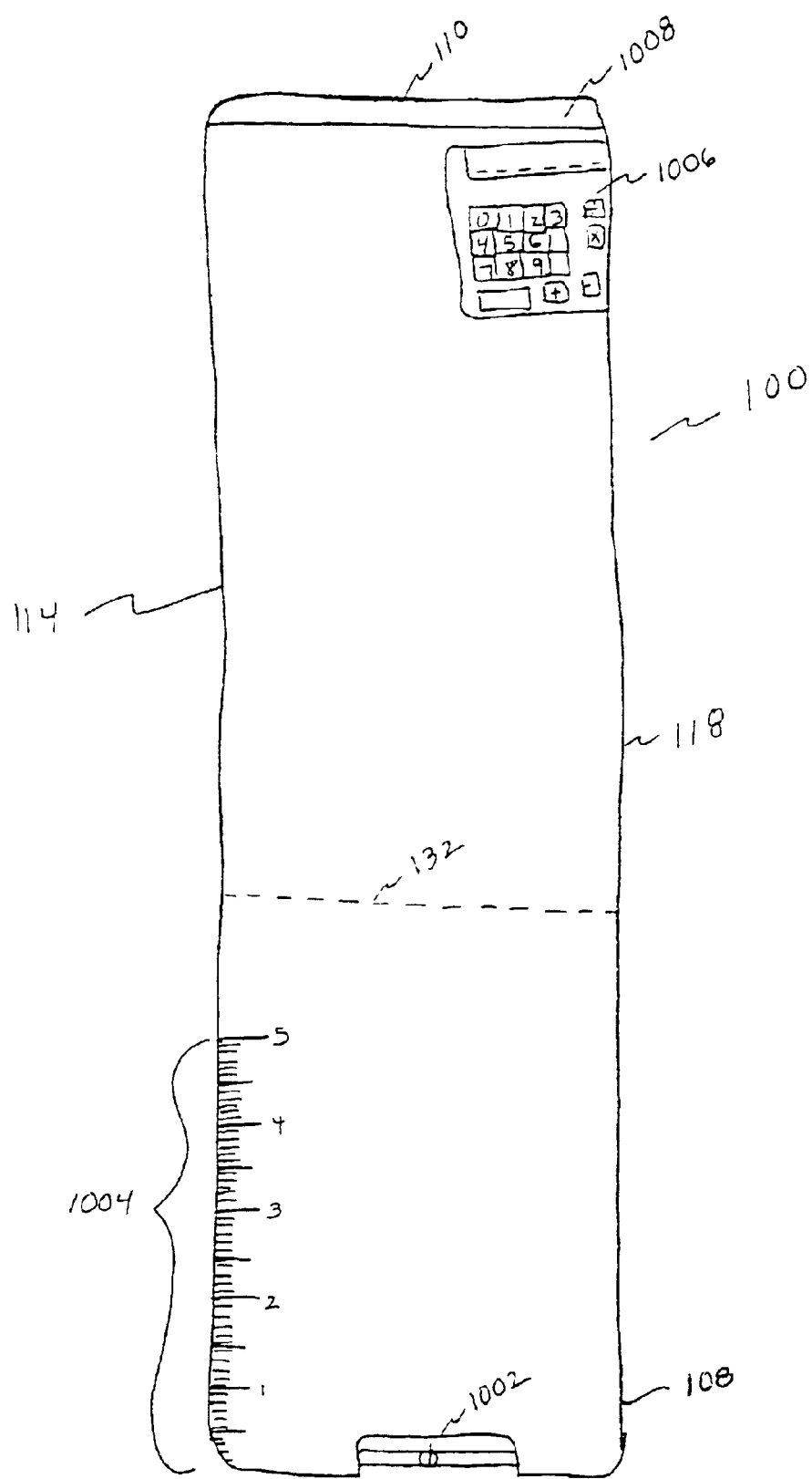
FIG. 10 is a front plan view of a support member with additional optional features that may be included in an exemplary embodiment of the present invention.

In addition, as depicted in FIG. 10, a variety of features may be added to the device so that the device may perform additional functions related to the target customer of the device. For example, a ruler 1004 may be drawn on one of the edges of the support member 100, or on one of the sides of the shelf member 200. Similarly, the support member 100 may include a cut out section 1002 for a gage or measuring device (e.g., a leveling device is depicted in FIG. 10) for measurements that are commonly made by the target customer. In addition, the device may include a light 1008 for illuminating the document or for use as a flashlight. The light 1008 may be built in as part of the device (e.g., at the top edge 110 of the support member 100, on top of the shelf ledge 220) or it may be removably attached to the device. Another feature that may be added to the support member 100 a retractable extension to accommodate tall documents. Tracks may be added to the back surface 118 of the support member 100 with a locking mechanism to keep the extension in an extended or non-extended position. Another feature that could be incorporated into the device is a compact calculator 1006 on the support member 100. The previous list of additional features is meant to be descriptive and not limiting as other additions are possible and depend on target customer requirements.

As described previously, an exemplary embodiment of the present invention provides a portable, compact and light-weight device for holding a document above a laptop computer screen 242. In addition, the laptop computer paper holder sets on the top of the laptop computer case 236 and is therefore easily attached and detached from the laptop computer case for use in a variety of environments including environments where there is substantially no workspace available for document reference. Likewise, the flat nature of the laptop computer paper support device allows it to be conveniently stored and carried by a traveler until it is set on top of the laptop computer case 236. The ability to imprint company and product information on the device and to tailor additional features for the device based on the target customers make the device useful as a marketing tool.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguishing one element from another.

What is claimed is:

1. A laptop computer paper support device for removably setting on the top of a laptop computer case and for holding at least one document above a screen on the laptop computer, said laptop computer paper support device comprising:
    a support member including a front surface, a top edge, a bottom edge, a left edge, a right edge and a connection axis passing through said left edge and said right edge, wherein said connection axis is substantially perpendicular to said left edge; and
    a shelf member pivotally attached at said connection axis to the front surface of said support member, said shelf member including:
        a top surface and a bottom surface;
        a shelf ledge adapted for maintaining a document upon the top surface of the shelf member, said shelf ledge attached to the top surface and extending upwardly from the top surface at a non-zero angle; and
        a shelf flange adapted for setting on the top of a laptop computer case, said shelf flange attached to the bottom surface and extending downwardly from the bottom surface at a non-zero angle;
    wherein the shelf member is movable between an open position wherein the shelf member is substantially perpendicular to the support member and a closed position wherein the shelf member is substantially parallel to the support member.

2. The device of claim 1 wherein said support member further includes a first pivot point on the left edge and a second pivot point on the right edge, wherein the first pivot point and the second pivot point lie on the connection axis.

3. The device of claim 2 wherein:
    said support member further includes:
        a first pivot arch on the left edge, said first pivot arch rounded and extending towards the back surface around the connection axis; and
        a second pivot arch on the right edge, said second pivot arch rounded and extending towards the back surface around the connection axis; and
    said shelf member further includes:
        a first shelf leg on the left side and including a first pivot pin adapted for connection to said first pivot point;
        a second shelf leg on the right side and including a pivot pin adapted for connection to said second pivot point;
        a first pivot surface on the left side adapted to fit into said first pivot arch for moving said shelf member between said open position and said closed position; and
        a second pivot surface on the right side adapted to fit into second pivot arch for moving said shelf member between said open position and said closed position.

4. The device of claim 3 wherein:
    said first pivot arch and said second pivot arch include:
        a closed position aperture;
        an open position aperture; and
        a pivot groove between said closed position aperture and said open position aperture;
    said first pivot surface and second pivot surface include a locking pin adapted to fit into said closed position apertures and said open position apertures; wherein
    said locking pins are fitted into said open position apertures for holding said device in said open position and said locking pins are fined into said closed position apertures for holding said device in said closed position.

5. The device of claim 1 wherein said support member further includes a shelf support member on the front surface above the connection axis and said shelf member pushes upwardly against said shelf support member when said device is in said open position.

6. The device of claim 1 wherein:
    said support member further includes a shelf leg aperture; and
    said shelf flange includes a shelf leg substantially parallel to said bottom surface of said shelf member;
    wherein said shelf leg extends through said shelf leg aperture when said device is in said closed position.

7. The device of claim 1 wherein said support member is substantially planar.

8. The device of claim 1 wherein the distance from the bottom edge of said support member to said connection axis is less than the distance from the top edge of said support member to said connection axis.

9. The device of claim 1 wherein said shelf member is substantially planar.

10. The device of claim 1 wherein said shelf member has a width substantially the same as said support member.

11. The device of claim 1 wherein said support member is substantially rectangular in shape and said left edge is at least twice as long as said top edge.

12. The device of claim 1 wherein said shelf member:
    is substantially rectangular in shape;
    further includes a left side and a top side; and
    the length of said left side is less than the length of said top side.

13. The device of claim 1 wherein:
    said shelf member includes a bottom side;
    said shelf ledge and said shelf flange are attached; and
    said shelf ledge and said shelf flange are pivotally connected to the bottom side of said shelf member via a shelf pivot pin.

14. The device of claim 1 wherein said support member further includes a ruler.

15. The device of claim 1 wherein said device further includes a light for illuminating said document.

16. The device of claim 1 wherein said support member further includes a retractable extension from said top edge for accommodating tall documents.

17. The device of claim 1 wherein said support member further includes a document clip member for holding the document in place.

18. The device of claim 1 wherein said support member further includes one or more ring apertures proximate to said left edge or to said right edge.

19. The device of claim 1 wherein said support member further includes three ring apertures proximate to said left edge or to said right edge, said three ring apertures sized and spaced to accommodate notebook rings from a three ring notebook.

20. The device of claim 1 wherein said support member further includes seven ring apertures proximate to said left edge or to said right edge, said seven ring apertures sized and spaced to accommodate notebook rings from a seven ring notebook.

21. The device of claim 1 wherein said support member further includes a hanging aperture proximate to said to edge for hanging said device.

22. The device of claim 1 wherein said device is made of a plastic material.

23. The device of claim 22 wherein said plastic material is polycarbonate.

24. The device of claim 22 wherein said plastic material is ABS.

25. The device of claim 1 wherein said support member further includes a calculator.

26. The device of claim 1 wherein said support member further includes a cut-out for a gage or measuring device.

27. In combination, a laptop computer and a laptop computer paper support device, said laptop computer comprising:

a laptop computer case including a top of the laptop computer case; and said laptop computer paper support device comprising:

a support member including a front surface, a top edge, a bottom edge, a left edge, a right edge and a connection axis passing through said left edge and said right edge, wherein said connection axis is substantially perpendicular to said left edge; and a shelf member pivotally attached at said connection axis to the front surface of said support member, said shelf member including:

a top surface and a bottom surface;

a shelf ledge adapted for maintaining a document upon the top surface of the shelf member, said shelf ledge attached to the top surface and extending upwardly from the top surface at a non-zero angle; and a shelf flange adapted for setting on the top of the laptop computer case, said shelf flange attached to the bottom surface and extending downwardly from the bottom surface at a non-zero angle;

wherein the shelf member is movable between an open position wherein the shelf member is substantially perpendicular to the support member and a closed position wherein the shelf member is substantially parallel to the support member.

28. A method for utilizing a laptop computer paper support device for removably setting on the top of a laptop computer case and for holding at least one document above a screen on the laptop computer; said method comprising:

receiving the laptop computer paper support device in a closed position, wherein said device comprises:

laptop computer paper support device comprising:

a support member including a front surface, a top edge, a bottom edge, a left edge, a right edge and a connection axis passing through said left edge and said right edge, wherein said connection axis is substantially perpendicular to said left edge; and a shelf member pivotally attached at said connection axis to the front surface of said support member, said shelf member including:

a top surface and a bottom surface;

a shelf ledge adapted for maintaining a document upon the top surface of the shelf member, said shelf ledge attached to the top surface and extending upwardly from the top surface at a non-zero angle; and a shelf flange adapted for setting on the top of a laptop computer case, said shelf flange attached to the bottom surface and extending downwardly from the bottom surface at a non-zero angle;

wherein the shelf member is movable between an open position wherein the shelf member is substantially perpendicular to the support member and the closed position wherein the shelf member is substantially parallel to the support member; moving said device into said open position; and setting said device on the top of the laptop computer case.

\* \* \* \* \*